United States Patent
Shi et al.

(10) Patent No.: US 11,256,850 B2
(45) Date of Patent: Feb. 22, 2022

(54) ITALIC CHARACTER CREATION MODULE AND METHOD

(71) Applicant: Ricoh Company, Ltd., Tokyo (JP)

(72) Inventors: Zhenwei Shi, Shanghai (CN); Takeshi Shikama, Kanagawa (JP); Chenglan Li, Shanghai (CN)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/201,125

(22) Filed: Mar. 15, 2021

(65) Prior Publication Data
US 2021/0294963 A1 Sep. 23, 2021

(30) Foreign Application Priority Data
Mar. 23, 2020 (CN) .......................... 202010210691.3

(51) Int. Cl.
*G06F 40/109* (2020.01)
*G06F 3/0482* (2013.01)
*G06F 40/106* (2020.01)

(52) U.S. Cl.
CPC .......... *G06F 40/109* (2020.01); *G06F 3/0482* (2013.01); *G06F 40/106* (2020.01)

(58) Field of Classification Search
None
See application file for complete search history.

(56) References Cited

U.S. PATENT DOCUMENTS

| | | | | |
|---|---|---|---|---|
| 5,712,663 A * | 1/1998 | Matsumoto | ............... | G09G 5/24 345/471 |
| 5,854,693 A * | 12/1998 | Yoshiura | ............ | H04N 1/32502 358/468 |
| 6,760,029 B1 * | 7/2004 | Phinney | ................. | G06K 15/02 345/471 |
| 7,643,031 B2 * | 1/2010 | Watanabe | ............. | G06T 11/203 345/467 |
| 2003/0229856 A1 * | 12/2003 | Lynn | ..................... | G06F 40/166 715/243 |
| 2014/0040730 A1 * | 2/2014 | Prasad | .................. | G06F 40/103 715/249 |
| 2020/0079111 A1 | 3/2020 | Shikama et al. | | |

FOREIGN PATENT DOCUMENTS

| | | | | |
|---|---|---|---|---|
| JP | 06051743 | A | * | 2/1994 |
| JP | 2785929 | B2 | * | 8/1998 |

OTHER PUBLICATIONS https://math.stackexchange.com/questions/232571/how-do-i-get-the-slope-on-a-circle (Year: 2012).*

* cited by examiner

*Primary Examiner* — Mandrita Brahmachari
(74) *Attorney, Agent, or Firm* — Xsensus LLP

(57) ABSTRACT

Disclosed are an italic character creation module and method for turning one or more characters selected by a user into italic characters in mobile equipment with a mobile operating system. The italic character creation module includes a screen storage part, an input display part, a waiting-for-processing character obtainment part, a slope generation part, a coordinate system setting part, and a shift processing part. It is possible to calculate a slope on the basis of a tilt angle input by the user, set corresponding 2D coordinate systems, and perform shift processing on the characters waiting for processing chosen by the user in the corresponding 2D coordinate systems so as to create italic characters.

6 Claims, 10 Drawing Sheets

ITALIC CHARACTER CREATION MODULE AND METHOD

BACKGROUND OF THE DISCLOSURE

1. Field of the Disclosure

The present disclosure relates to character creation, and more especially relates to an italic character creation module and method.

2. Description of the Related Art

Italic type is a font style realized by oblique type on the basis of normal font.

When people edit text, they often use italics to create an emphasis or focus the attention of readers. Italic characters are also usually adopted when expressing book titles, article titles, quotations, etc., so as to effectively distinguish them from normal characters and achieve an eye-catching purpose.

Mobile equipment includes mobile phones, tablets, and the like. In mobile equipment having a mobile operating system that does not support italics, such as the iOS™ operating system developed by Apple Inc., the lack of italic font libraries for Chinese, Japanese, and Korean due to small memory and other reasons makes it impossible to convert the characters of the three languages input and selected by a user into italics. Therefore, it cannot meet the people's needs of choosing a certain paragraph for highlighting or as a reference in the process of text editing.

In addition, the mobile equipment having the mobile operating system contains a large number of font libraries corresponding to the normal styles (not including the italic style) of Chinese, Japanese, and Korean. For those characters in different fonts, if a same tilt angle is set, the most beautiful italic characters cannot be obtained, thereby affecting the overall display effect.

SUMMARY OF THE DISCLOSURE

In light of the above, the present disclosure provides an italic character creation module and method by which it is possible to turn, based on a set tilt angle, the characters chosen by a user into italics in mobile equipment having a mobile operating system without a built-in italic font library.

According to a first aspect of the present disclosure, an italic character creation module is provided that may include a screen storage part, an input display part, a waiting-for-processing character obtainment part, a slope generation part, a coordinate system setting part, and a shift processing part. The screen storage part stores a character content input setting screen (also called an input setting screen) and a selection setting screen. The input display part displays the character content input setting screen by which a user may input a content of characters in normal style (also called a normal style character content) containing M characters in normal style (also called normal style characters) and select a normal style character content including N normal style characters from the normal style character content containing M normal style characters to serve as a character segment to be processed (also called a waiting-for-processing character segment). Here, M is an integer and greater than or equal to 1, and N is an integer and less than or equal to M. Once the user confirms the selected character segment to be processed, the waiting-for-processing character obtainment part sequentially obtains the N normal style characters from the selected character segment to be processed according to the order of the N normal characters to serve as N characters to be processed (also called N characters waiting for processing). The input display part further displays the selection setting screen by which the user may input a tilt angle θ. Once the user confirms the input tilt angle θ, the slope generation part generates a corresponding slope k on the basis of the input tilt angle θ. The coordinate system setting part sets a two dimensional (2D) coordinate system corresponding to each of the N characters waiting for processing. The shift processing part performs shift processing on each pixel of each of the N characters to be processed on the basis of the corresponding two dimensional coordinate system and the generated slope k, so as to create N italic characters.

According to a second aspect of the present disclosure, an italic character creation method is provided that may be inclusive of a character content input setting step of causing a user to input, by using an input setting screen, a normal style character content including M normal style characters and select a normal style character content containing N normal style characters from the normal style character content including M normal style characters to serve as a character segment to be processed, wherein, M is an integer and greater than or equal to 1, and N is an integer and less than or equal to M; a waiting-for-processing character obtainment step of sequentially obtaining the N normal style characters from the character segment to be processed according to the order of the N normal style characters to serve as N characters to be processed; a selection setting step of inputting a tilt angle θ; a slope generation step of generating a corresponding slope k on the basis of the input tilt angle θ; a coordinate system setting step of setting a two dimensional coordinate system corresponding to each of the N characters waiting for processing; and a shift processing step of performing shift processing on each pixel of each of the N characters to be processed on the basis of the corresponding two dimensional coordinate system and the generated slope k, so as to create N italic characters.

By utilizing the italic character creation module and method, it is possible to acquire, based on a tilt angle set by a user, a corresponding slope, set corresponding two dimensional coordinate systems, and conduct shift processing on the characters waiting for processing input and chosen by the user from a character content input setting screen in the corresponding two dimensional coordinate systems. Carrying out shift processing with respect to each pixel of each characters to be processed may generate italics. As a result, even in mobile equipment having a mobile operating system without a built-in italic library, it is also possible to turn those characters in different fonts into italic characters. In this way, when a user edits text in the mobile equipment with the mobile operating system, those characters that need to be highlighted or quoted can be achieved by setting italics, so that the user may immediately focus on the content of the highlighted segment when reading. Moreover, by setting different tilt angles, italic characters corresponding to the different tilt angles can be generated. Consequently, when turning those characters in different fonts into italics, it is possible to adjust the set tilt angle so as to render the generated italic characters to be more in line with aesthetic requirements.

DETAILED DESCRIPTION OF THE PREFERRED EMBODIMENTS

Figure 1:
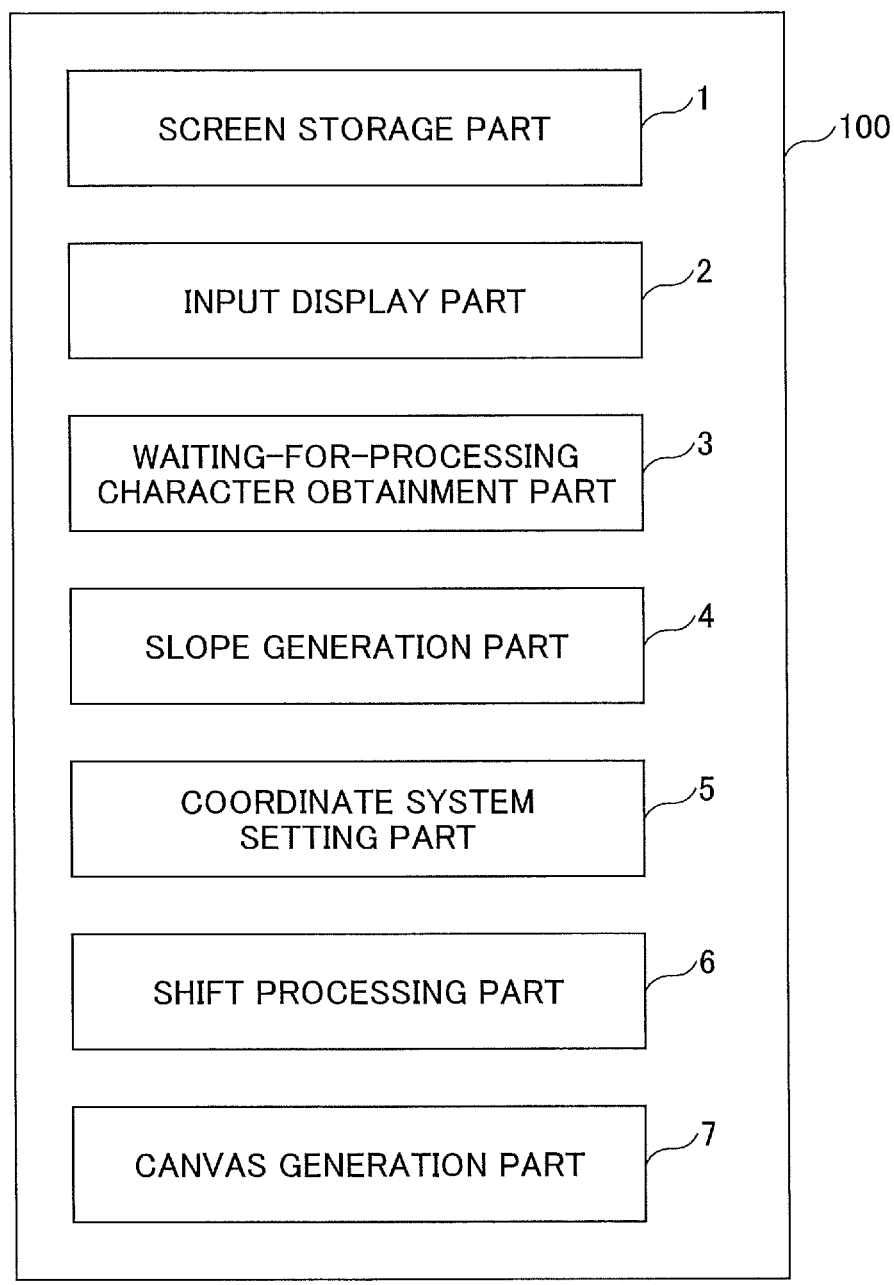
FIG. 1 is a block diagram of an italic character creation module according to one aspect of a first embodiment of the present disclosure.

In order to let a person skilled in the art better understand the present disclosure, hereinafter, the embodiments of the present disclosure are concretely described with reference to the drawings. However, it should be noted that the same symbols, that are in the specification and the drawings, stand for constructional elements having basically the same function and structure, and the repetition of the explanations to the constructional elements is omitted.

In what follows, an italic character creation module and method in accordance with the embodiments of the present disclosure are described in detail by referring to the drawings.

According to an embodiment, an italic character creation module is provided that may be inclusive of a screen storage part, an input display part, a waiting-for-processing character obtainment part, a slope generation part, a coordinate system setting part, and a shift processing part. The screen storage part stores a character content input setting screen and a selection setting screen. The input display part displays the character content input setting screen so as to cause a user to input a normal style character content including M normal style characters and select a normal style character content including N normal style characters from the normal style character content including M normal style characters to serve as a character segment to be processed. Here, M is an integer and greater than or equal to 1, and N is an integer and less than or equal to M. Once the user confirms the selected character segment to be processed, the waiting-for-processing character obtainment part sequentially obtains the N normal style characters from the selected character segment to be processed according to the order of the N normal characters to serve as N characters to be processed. The input display part further displays the selection setting screen so as to let the user input a tilt angle θ. Once the user confirms the input tilt angle θ, the slope generation part generates a corresponding slope k based on the input tilt angle θ. The coordinate system setting part sets a two dimensional coordinate system corresponding to each of the N characters waiting for processing. The shift processing part performs shift processing on each pixel of each of the N characters to be processed based on the corresponding two dimensional coordinate system and the generated slope k, so as to generate N italic characters.

In this embodiment, the slope generation part calculates the slope k on the basis of an equation k=cot θ.

In this embodiment, the coordinate system part sets the two dimensional coordinate system by making the pixel point, located at the bottom left corner of each of the N characters to be processed, be the origin of the two dimensional coordinate system.

In this embodiment, a canvas generation part may further be included that can generate an initial canvas on the basis of the region where the character segment to be processed is located, produce a supplementary canvas in a predetermined location of the character segment to be processed after the user confirms the input tilt angle θ, and fit together the initial canvas and the supplementary canvas at the predetermined location so as to create an italic character canvas.

In this embodiment, the character content input setting screen may contain a layout type setting region by which the user may set a type of layout. There may exist two types of layout, namely, horizontal typesetting and vertical typesetting. When the type of layout is horizontal typesetting, the predetermined location is the right side of the last normal style character in any row of the character segment to be processed, the height of the supplementary canvas is equal to the height h of any row in the character segment to be processed, and the width of the supplementary canvas is h·tan θ. When the type of layout is vertical typesetting, the predetermined location is the lower side of the last normal character in any column of the character segment to be processed, the width of the supplementary canvas equals the width s of any column in the character segment to be processed, and the height of the supplementary canvas is s·tan θ.

In this embodiment, the character content input setting screen may further include a layout type setting region so as to cause the user to set a type of layout. The type of layout is inclusive of horizontal typesetting and vertical typesetting. The shift processing part may further carry out the shift processing on the basis of shift processing functions and the type of layout.

Particularly, if it is assumed that the coordinates of each pixel in a character to be processed are (x, y) in the corresponding two dimensional coordinate system, and the coordinates of the same pixel in the corresponding italic character are (x', y') in the same two dimensional coordinate system, then the shift processing functions corresponding to horizontal typesetting are x'=x+y·tan θ and y'=y, and the shift processing functions corresponding to vertical typesetting are x'=x and y'=x·tan θ+y.

In this embodiment, the selection setting screen may have a preview region. Once the shift processing part generates the N italic characters, the input display part may sequentially display the generated N italic characters in the preview region according the order of them.

According to another embodiment, an italic character creation method is provided that may contain a character content input setting step of inputting a normal style character content including M (here, M is an integer and greater than or equal to 1) normal style characters and setting a type of layout, and further selecting a normal style character content containing N (here, N is an integer and less than or equal to M) normal style characters from the normal style character content including M normal style characters to serve as a character segment to be processed; a selection setting step of inputting a tilt angle θ; a waiting-for-processing character obtainment step of sequentially obtaining the N normal style characters in the character segment to be processed according to the order of their arrangement to serve as N characters waiting for processing; a slope generation step of generating a slope k corresponding to the input tilt angle on the basis of the input tilt angle θ; a coordinate system setting step of setting a two dimensional coordinate system corresponding to each of the N characters waiting for processing; and a shift processing step of conducting shift processing on each pixel of each of the N characters waiting for processing based on the corresponding two dimensional coordinate system and the generated slope k, so as to create N italic characters.

First Embodiment

According to one aspect of this embodiment, an italic character creation module is provided as follows.

FIG. 1 is a block diagram of an italic character creation module 100 in accordance with this embodiment.

As shown in FIG. 1, the italic character creation module 100 is configured to turn the characters chosen by a user in mobile equipment with a mobile operating system into italic characters, and include a screen storage part 1, an input display part 2, a waiting-for-processing character obtainment part 3, a slope generation part 4, a coordinate system setting part 5, a shift processing part 6, and a canvas generation part 7.

In this embodiment, the mobile equipment may be a smart phone, a tablet computer, and so on, and the mobile operating system may be the iOS™ operating system in the smart phone, the tablet computer, and the like. The iOS™ operating system does not support italics.

The screen storage part 1 may store a character content input setting screen and a selection setting screen.

The character content input setting screen is used to cause the user to input a normal style character content including M (here, M is an integer and greater than or equal to 1) normal style characters and set a type of layout, and further choose a normal style character content containing N (here, N is an integer and less than or equal to M) normal style characters from the normal style character content including M normal style characters to serve as a character segment to be processed.

In this embodiment, the character content input setting screen may further be inclusive of a layout type setting region by which the user may set a type of layout. There may exist two types of layout, i.e., horizontal typesetting and vertical typesetting.

In this embodiment, the character segment to be processed is in a black character (letter) font.

Figure 2:
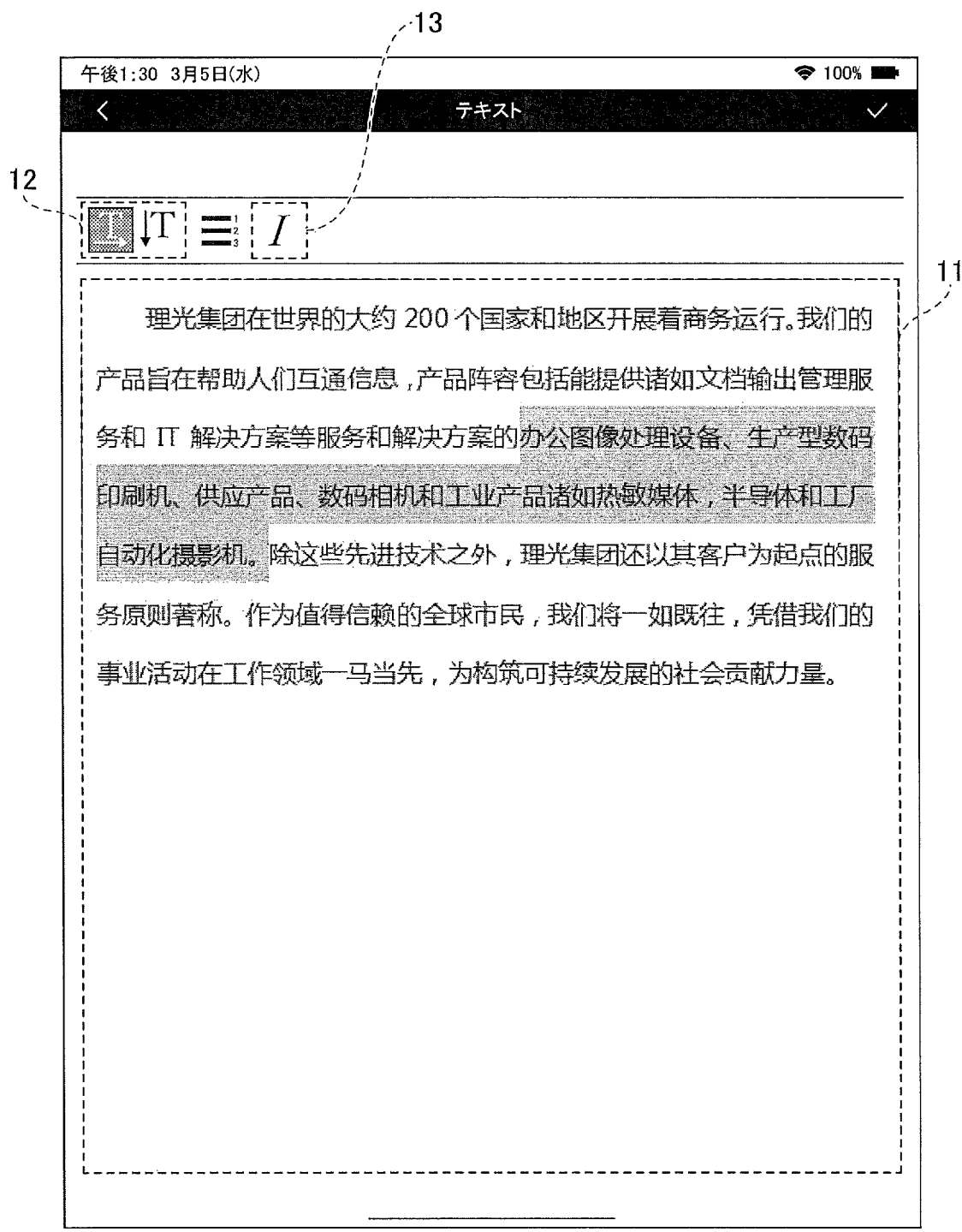
FIG. 2 illustrates a character content input setting screen when performing horizontal typesetting in the first embodiment.

FIG. 2 illustrates a character content input setting screen in a case of horizontal typesetting.

The character content input setting screen contains a character content input region 11, a layout type setting region 12, and an italic style processing button 13.

As presented in FIG. 2, in this embodiment, a content consisting of Chinese characters has been input into the character content input region 11 of the character content input setting screen, the type of layout of the content has been selected as horizontal typesetting in the layout type setting region 12, and a segment on the dark background of the content has been chosen to serve as a character segment to be processed. The italic style processing button 13 may be utilized to make a confirmation with respect to the character segment to be processed.

Figure 3:
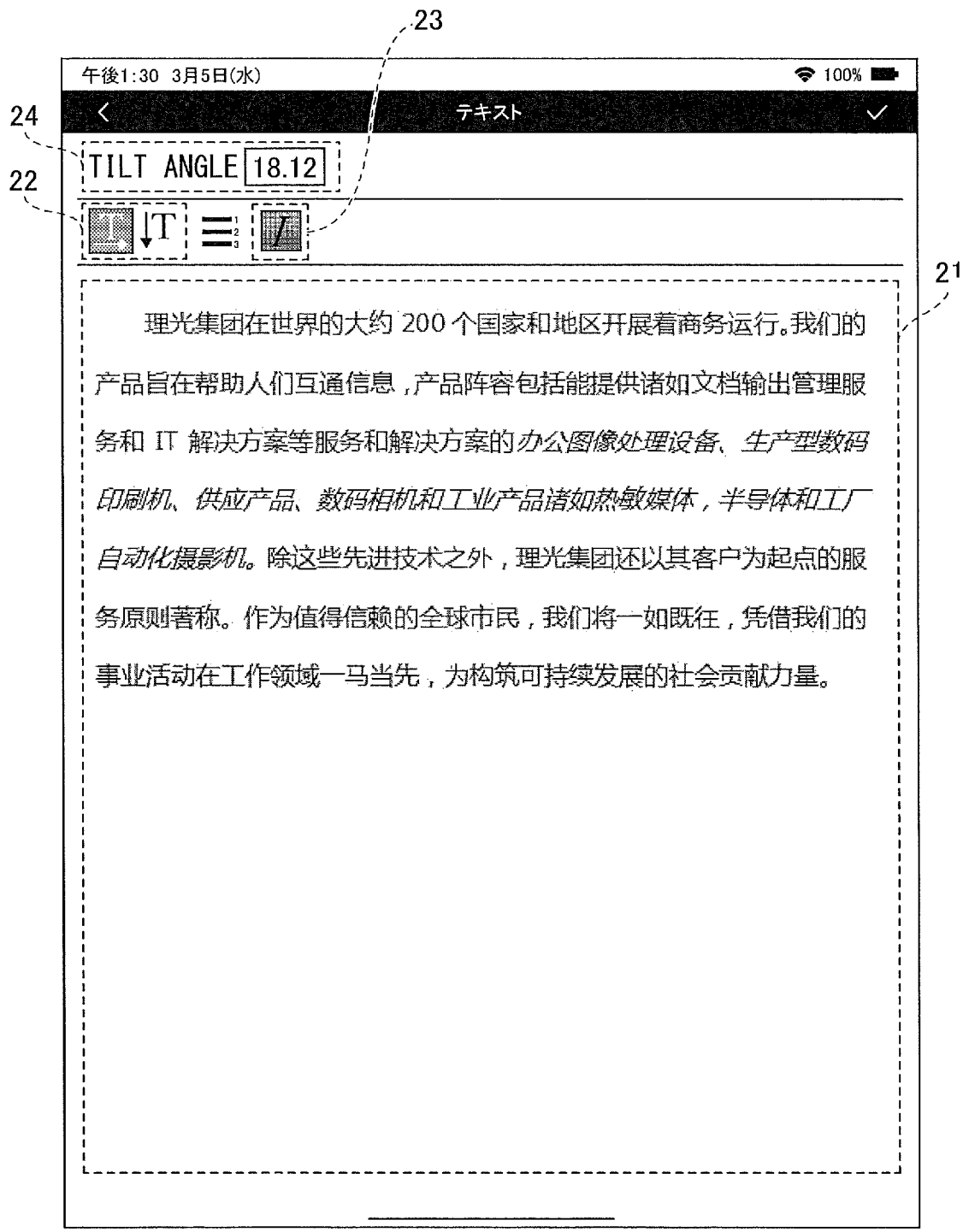
FIG. 3 illustrates a selection setting screen when conducting horizontal typesetting in the first embodiment.

FIG. 3 illustrates a selection setting screen when conducting horizontal typesetting.

As shown in FIG. 3, the selection setting screen may cause the user to input a tilt angle θ for creating italic characters (i.e., performing shift processing on the character segment to be processed) and display the created italic characters. Moreover, a character display region 21, a layout type display region 22, an italic style processing button display region 23, and a tilt angle setting region 24 are included in the selection setting screen.

The character display region 21 is used to display the created italic characters and the unprocessed (remaining) characters.

The layout type display region 22 is utilized to display the type of layout.

The italic style processing button display region 23 may display that the character segment to be processed is currently in the process of italic style processing.

In this embodiment, by clicking the input box of the tilt angle setting region 24 in FIG. 3, then inputting 18.12 (i.e., a tilt angle) into the input box, and then clicking any position except the input box in the selection setting screen, it is possible to confirm the input tilt angle.

Furthermore, in this embodiment, the character content input setting screen is basically similar to the selection setting screen, but the selection setting screen has an additional tilt angle setting region 24 at the upper left corner.

Referring again to FIG. 1; the input display part 2 may display the character content input setting screen and the selection setting screen.

The waiting-for-processing character obtainment part 3 may be used to sequentially obtain the N normal style characters from the character segment to be processed according to the order of the N normal characters to serve as N characters waiting for processing.

In this embodiment, once the user clicks the italic style processing button 13 on the upper side of the selection setting screen shown in FIG. 2 to make a confirmation in regard to the character segment to be processed (i.e., the selected segment on the dark background of the input content presented in FIG. 2), the waiting-for-processing character obtainment part 3 may sequentially obtain each character of the character segment to be processed to serve as corresponding characters waiting for processing.

The slope generation part 4 may generate a corresponding slope on the basis of the tilt angle θ input.

In this embodiment, once the user confirms the input tilt angle θ, the slope generation part 4 calculates a slope k based on the input tilt angle θ (i.e., 18.12 as indicated in the input box on the upper side of FIG. 3). The calculation equation is $k=\cot\theta=\cot(18.12°)$.

The coordinate system setting part 5 may be utilized to set a two-dimensional coordinate system corresponding to each of the normal style characters waiting for processing.

Figure 4:
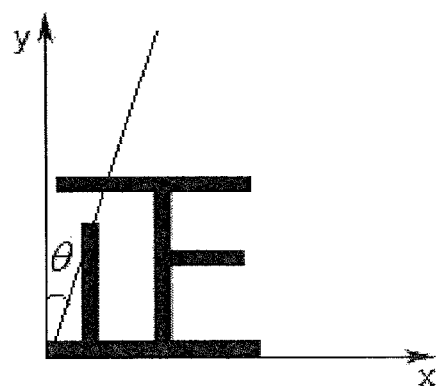
FIG. 4 illustrates a Chinese character in the upright type in a two dimensional coordinate system in the first embodiment.

FIG. 4 illustrates a Chinese character in the upright type in a two dimensional coordinate system. In this embodiment, the coordinate system setting part 5 may set a two-dimensional coordinate system for each character to be processed. As shown in FIG. 4, a Chinese character in the upright type is taken as an example for illustration. The coordinate system setting part 5 may set a two-dimensional coordinate system in which the pixel point at the bottom left corner of the Chinese character is the origin, the horizontal line along the bottom of the Chinese character is the x axis, and the y axis is perpendicular to the x axis. Additionally, in this drawing, θ is indicative of a tilt angle input, and the oblique line stands for the slope corresponding to the input tilt angle.

In another example, it is also possible to set a two-dimensional coordinate system by letting any pixel point of the Chinese character be the origin. As long as the slope is the same, the setting of the origin does not influence generating italic characters.

The shift processing part 6 may conduct shift processing on each pixel of each character waiting for processing on the basis of the corresponding two dimensional coordinate system and the calculated slope, so as to create corresponding italic characters after shift processing.

In this embodiment, if is supposed that the coordinates of each pixel of a character to be processed in the corresponding two dimensional coordinate system are (x, y) and the coordinates of the same pixel of the corresponding italic character are (x', y'), then shift processing functions in a case of horizontal typesetting are x'=x+y·tan θ and y'=y.

Figure 5:
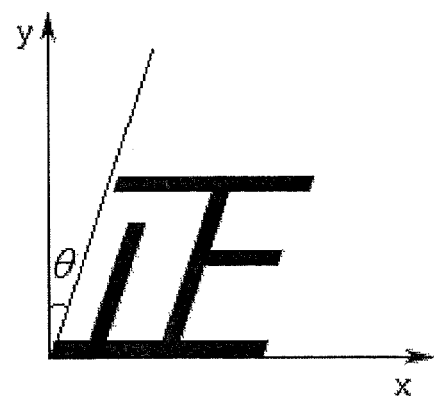
FIG. 5 illustrates an italic character generated when carrying out horizontal typesetting in a two dimensional coordinate system in the first embodiment.

FIG. 5 illustrates an italic character generated when carrying out horizontal typesetting in a two dimensional coordinate system.

As presented in FIG. 5, after shift processing is performed on each pixel of the Chinese character as shown in FIG. 4 by using the shift processing functions, an italic character may be generated. In this drawing, θ indicates an input tilt angle, and the oblique line refers to the slope corresponding to the input tilt angle.

After the shift processing part 6 carries out shift processing, the characters on the dark background to be processed as shown in FIG. 2 may be displayed in italic style on the character display region 21 of FIG. 3. Subsequently, the user may observe the effect of the generated italic characters. If the user is not satisfied with the effect of the generated italic characters, then he/she can reinput a new tilt angle so as to attain new italic characters until the effect of the newly generated italic characters meets the demands of the user. It is clear that in this way, the italic characters attained may have an eye-catching effect which can attract the focus of a reader when he/she reads the relevant content.

Again, referring to FIG. 1; the canvas generation part 7 may be configured to generate an initial canvas on the basis of the region where the character segment to be processed is located, produce a supplementary canvas at a predetermined location of the character segment waiting for processing after the user makes a confirmation with respect to the input tilt angle, and further combine the initial canvas and the supplementary canvas at the predetermined location so as to generate an italic character canvas.

In this embodiment, the type of layout is horizontal typesetting. As such, the predetermined location is the right side of the last normal style character in any row of the character segment to be processed. The height of the supplementary canvas is equal to the height h of any row of the character segment waiting for processing, and the width of the supplementary canvas is h·tan θ.

Here it is worth noting that the italic character canvas is a region necessary to display the generated italic characters in the character display region 21 of the selection setting screen as illustrated in FIG. 3.

According to another aspect of this embodiment, an italic character creation method is provided in what follows.

Figure 6:
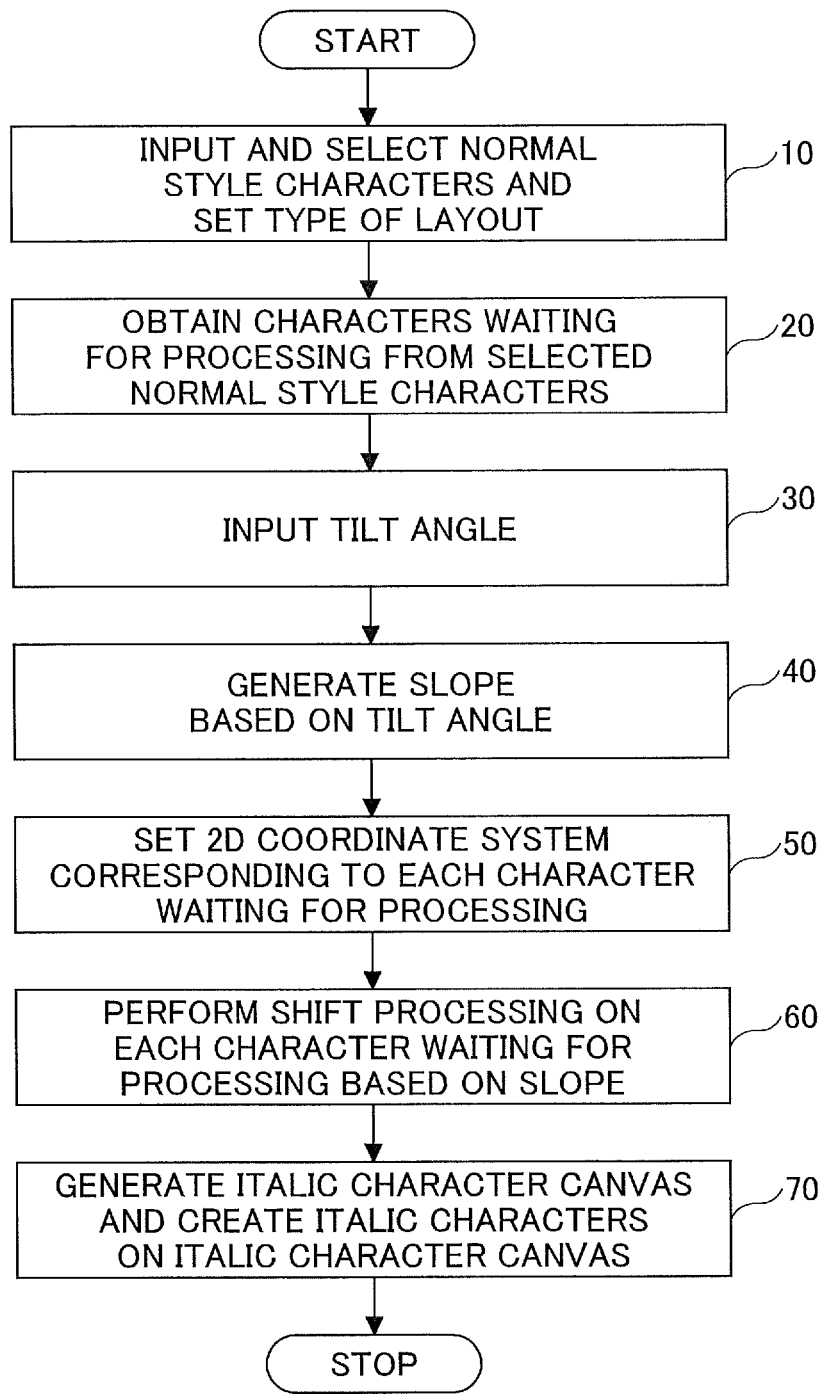
FIG. 6 is a flowchart of an italic character creation method in accordance with another aspect of the first embodiment of the present disclosure.

FIG. 6 is a flowchart of an italic character creation method in accordance with this embodiment.

As shown in FIG. 6, the italic character creation method includes STEPS 10 to 70.

In STEP 10, a character content input setting screen is displayed so as to let a user input a normal style character content containing M normal style characters and select a normal style character content including N normal style characters from the normal style character content containing M normal style characters to serve as a character segment to be processed. Here, M is an integer and greater than or equal to 1, and N is an integer and less than or equal to M.

STEP 20 is sequentially obtaining the N normal style characters from the character segment to be processed according to the order of the N normal style characters to serve as N characters waiting for processing.

In STEP 30, in a selection setting screen, a tilt angle θ is input and confirmed by the user.

STEP 40 is generating a corresponding slope k on the basis of the tilt angle θ input.

In STEP 50, a two dimensional coordinate system corresponding to each of the N characters to be processed in set.

STEP 60 is performing shift processing on each pixel of each of the N characters waiting for processing on the basis of the corresponding two dimensional coordinate system and the generated slope k, so as to form N italic characters after shift processing.

In STEP 70, an italic character canvas is generated in which the formed N italic characters are created and displayed on the selection setting screen.

Figure 7:
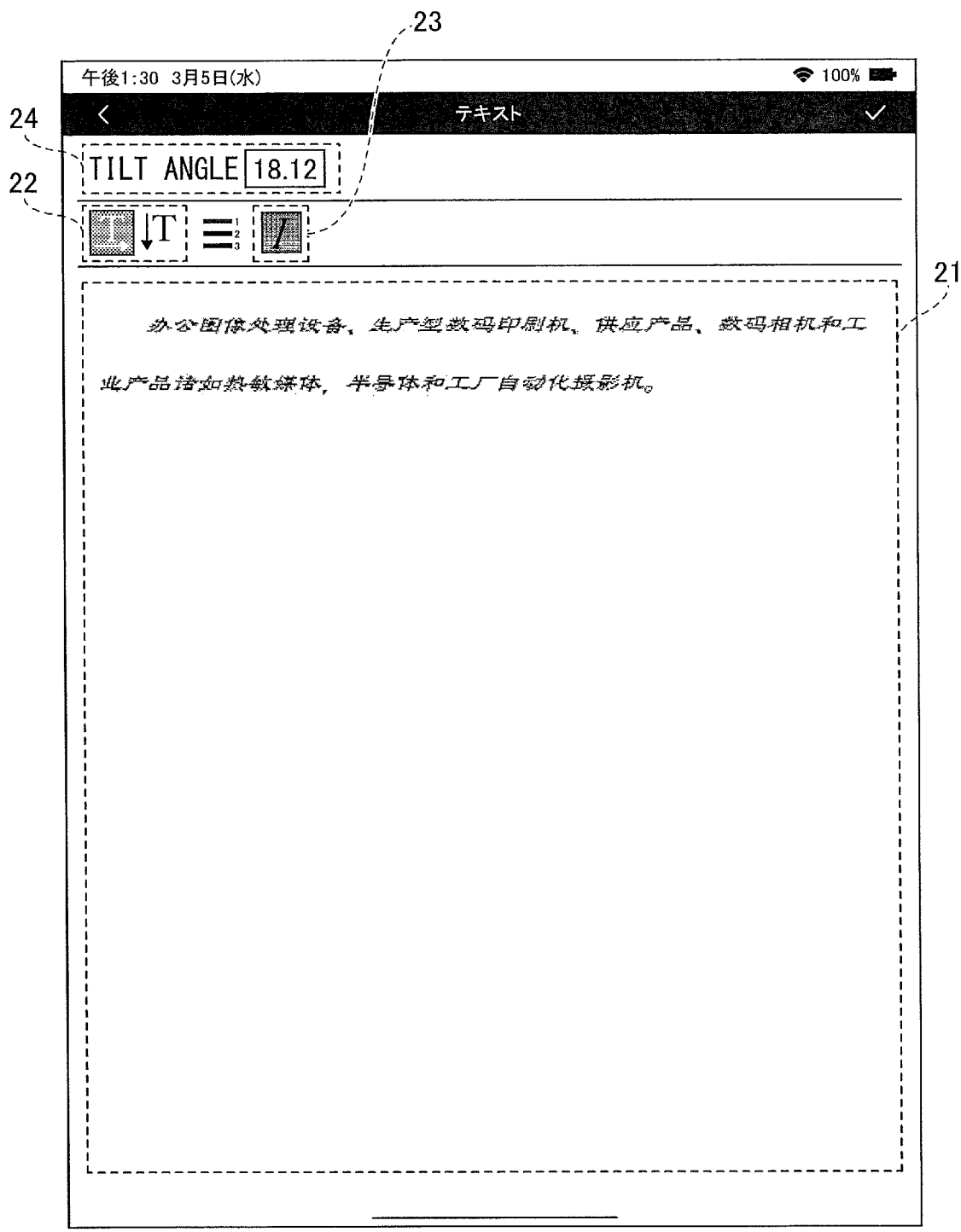
FIG. 7 illustrates a selection setting screen on which italic characters created from official scripts are displayed in a case of horizontal typesetting in the first embodiment.

FIG. 7 illustrates a selection setting screen on which italic characters created from official scripts are displayed in a case of horizontal typesetting.

As presented in FIG. 7, in the selection setting screen, the italic characters created when the original characters to be processed are official scripts are displayed, and the set tilt angle is 18.12°.

Here it is noteworthy that in another embodiment, italic character creation may also be conducted on characters in a font different from the official scripts.

Figure 8:
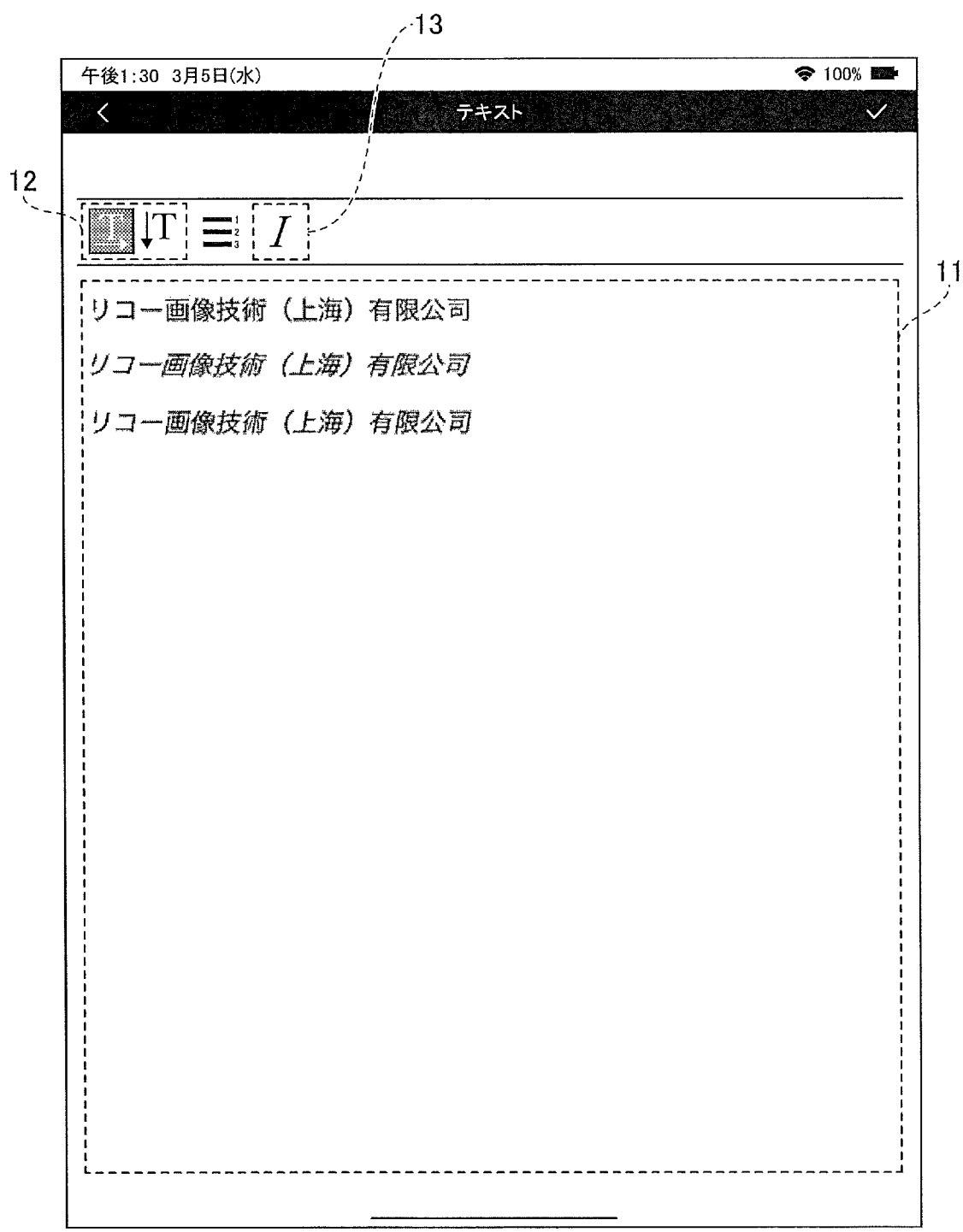
FIG. 8 illustrates different italic characters created based on different tilt angles when conducting horizontal typesetting in the first embodiment.

FIG. 8 illustrates different italic characters created based on different tilt angles when conducting horizontal typesetting.

As shown in FIG. 8, all the characters on the screen are in a black character (letter) font. The characters of the first row are in normal style. In the second row, the characters are italics created by using a tilt angle 18.12°. The third row is composed of italic characters generated when the corresponding tilt angle is 10°.

Here it is worth pointing out that in another embodiment, it is also possible to set a tilt angle different from 18.12° and 10°.

It is obvious from FIG. 8 that in a case of the same font, different tilt angles may make the eye-catching effects of the corresponding italic characters different. When the tilt angle is 18.12°, the corresponding italic characters are more salient, and when the tilt angle is 10°, the corresponding italic characters are more beautiful and natural.

Second Embodiment

First, it should be noted that in this embodiment, the constructional elements having basically the same function and structure with those constructional elements in the first embodiment are given the same symbols, and the repetition of the explanations to them is omitted. Moreover, the following description is on the basis of the contents of the first embodiment.

Compared to the first embodiment, the difference in this embodiment is that the type of layout input by a user is vertical typesetting.

In this embodiment, if it is assumed that the coordinates of each pixel in each character to be processed are (x, y) in the corresponding two dimensional coordinate system, and the coordinates of the same pixel in the corresponding italic character are (x', y') in the same two dimensional coordinate system, then shift processing functions in a case of vertical typesetting are $x'=x$ and $y'=x\cdot\tan\theta+y$.

Because the type of layout in this embodiment is vertical typesetting, the predetermined location is the lower side of the last normal style character in any column of the character segment to be processed. Furthermore, the width of the supplementary canvas equals the width s of any column in the character content to be processed, and the height of the supplementary canvas is $s\cdot\tan\theta$.

Figure 9:
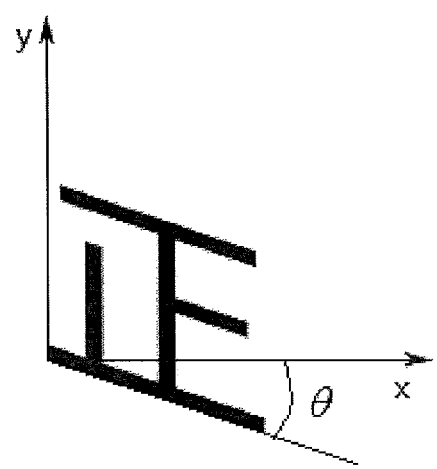
FIG. 9 illustrates an italic character generated when carrying out vertical typesetting in a two dimensional coordinate system in a second embodiment of the present disclosure.

FIG. 9 illustrates an italic character generated when carrying out vertical typesetting in a two dimensional coordinate system.

As shown in FIG. 9, an italic Chinese character is obtained after shift processing based on the shift processing functions is conducted on each pixel of the corresponding original Chinese character. In the two dimensional coordinate system of this drawing, θ is a set tilt angle, and the oblique line represents the slope corresponding to the set tilt angle.

Figure 10:
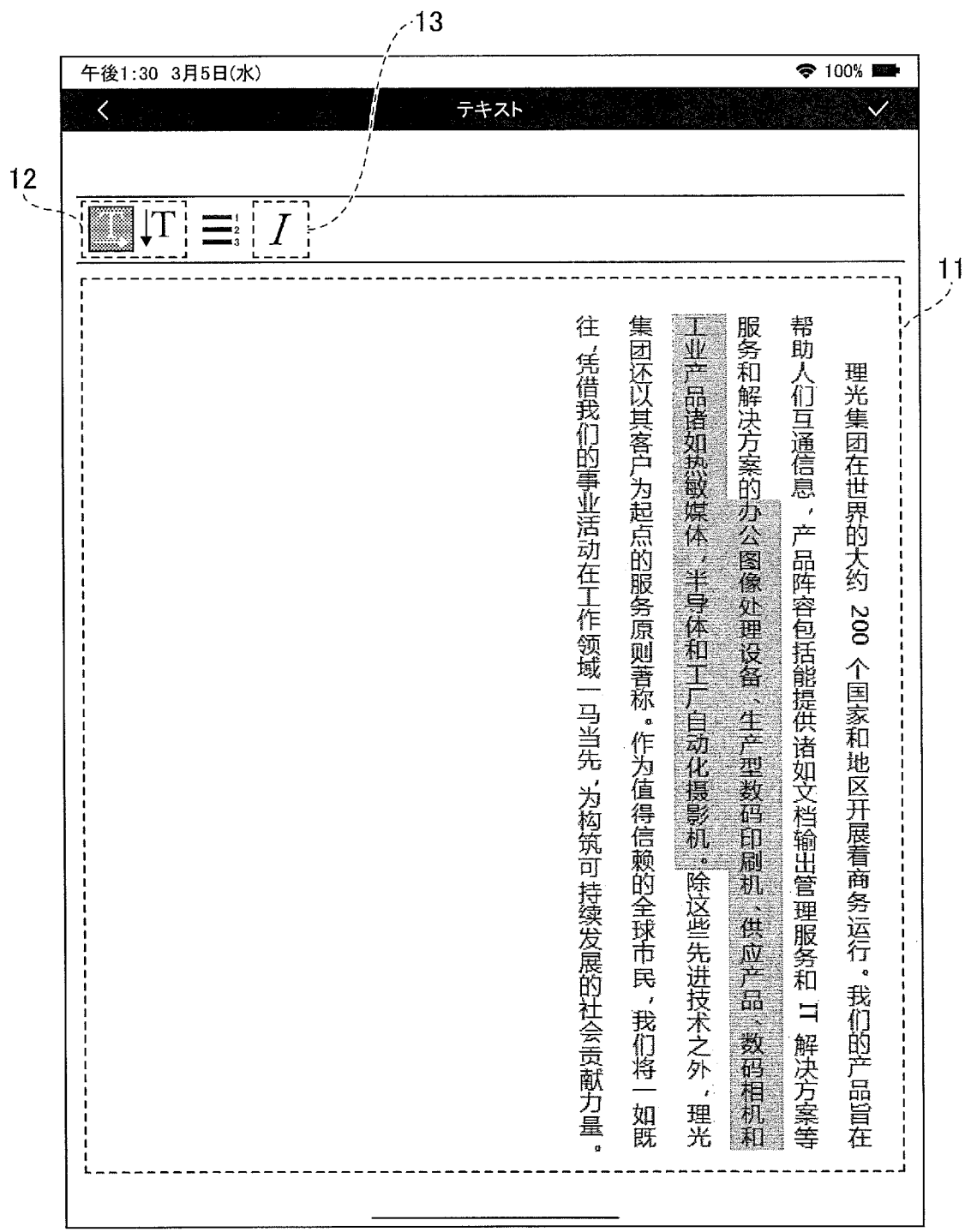
FIG. 10 illustrates a character content input setting screen when conducting vertical typesetting in the second embodiment.

FIG. 10 illustrates a character content input setting screen in a case of vertical typesetting.

As presented in FIG. 10, the user has input a content consisting of Chinese characters in normal style into the character content input setting screen, set the type of layout as vertical typesetting, and selected a segment including those characters on the dark background from the content to serve as a character segment to be processed.

Figure 11:
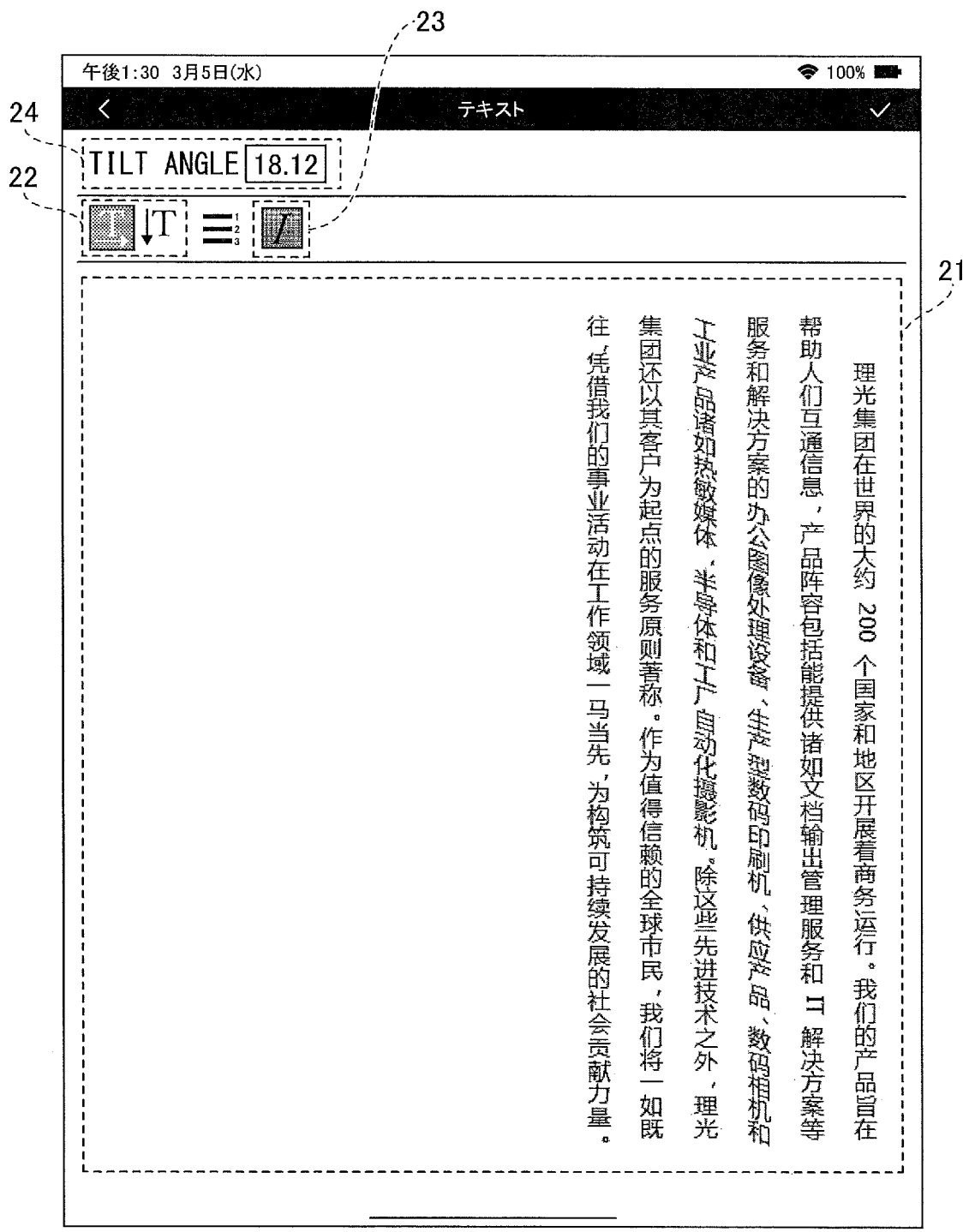
FIG. 11 illustrates a selection setting screen when performing vertical typesetting in the second embodiment.

FIG. 11 illustrates a selection setting screen when in a case of vertical typesetting.

As shown in FIG. 11, the input tilt angle is 18.12° in this embodiment. After the shift processing part of the italic character creation module according to the first embodiment carries out shift processing with respect to the character segment waiting for processing in FIG. 10, the shifted characters (i.e. the created italic characters) are displayed on the selection setting screen. If the user is not satisfactory with the effect of the created italic characters, he/she can reinput a new tilt angle so as to acquire newly created italic characters until the effect of the newly created italic characters meets the needs of the user.

To sum up, by taking advantage of the italic character creation module and method according to the embodiments of the present disclosure, it is possible to obtain a corresponding slope based on a tilt angle input by a user, set corresponding two dimensional coordinate systems, and in the corresponding two dimensional coordinate systems, further perform shift processing on the characters waiting for processing input and chosen by the user in a character content input setting screen. When carrying out the shift processing, different shift processing functions may be adopted in accordance with different types of layout (i.e., horizontal typesetting and vertical typesetting) to handle each pixel of each character waiting for processing so as to attain italic characters. As a result, the italic character creation module and method can be implemented in mobile equipment having a mobile operating system without a built-in italic library, so that those characters in different fonts are able to be turned into italics. In this way, when a user edits text in the mobile equipment having the mobile operating system, the characters that need to be highlighted or quoted can be achieved by setting italics, so that the user may immediately focus on the content of the highlighted segment when reading.

In addition, by setting different tilt angles, italic characters corresponding to the different tilt angles can be generated. On this score, when converting those characters in different fonts into italics, it is possible to adjust the set tilt angle so as to cause the created italic characters to be more in line with aesthetic requirements.

Up to here, the italic character creation module and method according to the embodiments of the present disclosure have been explained in detail. However, the present disclosure is not limited to these embodiments.

For example, in another embodiment, the italic character creation module may further have an output part. After the shift processing part accomplishes the shift processing in regard to each character to be processed, the output part may output the created italic characters as paste-able text or an image formed from them.

In still anther embodiment, there may exist a preview region in the selection setting screen. Once a user inputs a tilt angle, and the shift processing part creates italic characters corresponding to a character segment to be processed, the italic characters generated can be displayed in the preview region according to the order of them. As a result, the user may check whether the italic characters created based on the current tilt angle satisfy aesthetic demands, and if the aesthetic demands are not satisfied, reset a new tilt angle until obtaining new italic characters meeting the aesthetic demands. Subsequently, the newly obtained italic characters meeting the aesthetic demands can be displayed on the character content input setting screen, thereby being capable of rapidly and effectively determining a proper tilt angle when it is necessary to turn a large number of characters into italics.

In yet another embodiment, a tilt angle confirmation button may further be encompassed in the selection setting screen, by which a user can make a confirmation with respect to an input tilt angle.

Additionally, in the embodiments set forth above, the components involved in the character content input setting screen and the selection setting screen are basically similar. However, in other embodiments, these two screens may also be totally different. For example, the selection setting screen can be inclusive of only the character display region and the tilt angle setting region.

While the present disclosure is described with reference to the specific embodiments chosen for purpose of illustration, it should be apparent that the present disclosure is not limited to these embodiments, but numerous modifications could be made thereto by a person skilled in the art without departing from the basic concept and technical scope of the present disclosure.

The present application is based on and claims the benefit of priority of Chinese Patent Application No. 202010210691.3 filed on Mar. 23, 2020, the entire contents of which are hereby incorporated by reference.

What is claimed is:

1. An italic character creation method of turning one or more characters selected by a user into italic characters in mobile equipment with a mobile operating system, the italic character creation method comprising:
   receiving a first user input, via an input setting screen displayed by a display of the mobile equipment, of a normal style character content including M normal style characters, M being an integer greater than or equal to 1;

selecting a normal character content containing N normal style characters, from the normal style character content including the M normal style characters, to serve as a character segment to be processed, N being an integer and less than or equal to M;

sequentially obtaining the N normal style characters from the character segment to be processed according to an order of the N normal style characters to serve as N characters waiting for processing;

receiving a second user input, in a tilt angle setting region displayed by the display, of a numerical value of a tilt angle θ;

generating a slope k based on the tilt angle θ;

setting a two-dimensional coordinate system corresponding to each of the N characters waiting for processing;

performing shift processing on each pixel of each of the N characters waiting for processing, based on the corresponding two-dimensional coordinate system and the slope k, to create N italic characters; and outputting the N italic characters on the display.

2. The italic character creation method in accordance with claim 1, wherein, the slope k is calculated according to k=cotθ.

3. The italic character creation method in accordance with claim 1, wherein, the two dimensional coordinate system is set by using a pixel point at a bottom left corner of each of the N characters waiting for processing as an origin.

4. The italic character creation method in accordance with claim 1, further comprising:

generating an initial canvas based on a region where the character segment to be processed is located;

generating a supplementary canvas at a predetermined location of the character segment to be processed after the user inputs the second user input of the tilt angle θ; and fitting together the initial canvas and the supplementary canvas at the predetermined location to generate an italic character canvas.

5. The italic character creation method in accordance with claim 4, wherein the input setting screen contains a layout type setting region used by the user to set a type of layout, the type of layout includes horizontal typesetting and vertical typesetting, in a case that the type of layout is horizontal typesetting, the predetermined location is a right side of a last normal style character in any row of the character segment to be processed, a height of the supplementary canvas is equal to a height h of any row of the character segment to be processed, and a width of the supplementary canvas is h·tanθ, and in a case that the type of layout is vertical typesetting, the predetermined location is a lower side of a last normal style character in any column of the character segment to be processed, a width of the supplementary canvas is equal to a width s of any column of the character segment to be processed, and a height of the supplementary canvas is s·tanθ.

6. The italic character creation method in accordance with claim 1, wherein the input setting screen contains a layout type setting region used by the user to set a type of layout, the type of layout includes horizontal typesetting and vertical typesetting, the shift processing is carried out based on shift processing functions and the type of layout, and in a case that coordinates of each pixel point in each of the N characters waiting for processing are (x, y) in the corresponding two dimensional coordinate system, and coordinates of the same pixel point in the corresponding italic character are (x', y') in the same two dimensional coordinate system, the shift processing functions corresponding to horizontal typesetting are x'=x+y·tanθ and y'=y, and the shift processing functions corresponding to vertical typesetting are x'=x and y'=x·tanθ+y.

\* \* \* \* \*